United States Patent [19]

Nomura et al.

[11] 4,259,626
[45] Mar. 31, 1981

[54] SERVO CONTROL SYSTEM OPERABLE ON DIGITAL BASIS WITH LIMIT CYCLE SUPPRESSED

[75] Inventors: Tadashi Nomura; Hiroshi Inada, both of Tokyo, Japan

[73] Assignee: Nippon Electric Co., Ltd., Tokyo, Japan

[21] Appl. No.: 46,291

[22] Filed: Jun. 7, 1979

[30] Foreign Application Priority Data

Jun. 9, 1978 [JP] Japan .................................. 53-70074
Nov. 8, 1978 [JP] Japan ................................ 53-137495
Mar. 30, 1979 [JP] Japan .................................. 54-39168
Apr. 20, 1979 [JP] Japan .................................. 54-49336

[51] Int. Cl.³ .......................................... G05B 11/28
[52] U.S. Cl. .................................... 318/599; 318/603; 318/608
[58] Field of Search ............... 318/603, 599, 608, 561, 318/600; 400/144.2, 163

[56] References Cited

U.S. PATENT DOCUMENTS 3,954,163  9/1974  Gabor ............................. 400/144.2
4,146,922  3/1979  Brown et al. ..................... 318/599 X
4,169,991  10/1979  Ross ................................. 318/603 X
4,194,144  3/1980  Reynolds ........................... 318/603

*Primary Examiner*—B. Dobeck
*Attorney, Agent, or Firm*—Sughrue, Rothwell, Mion, Zinn and Macpeak

[57] ABSTRACT

In a digital servo control system (31) for a carriage of a serial printer or a like movable element, a control signal (125) digitally represents a reference angular velocity for a motor (26) until an instant at which a displacement from a current position of the element to a commanded position decreases to a predetermined value, a positional error during a preselected interval following the instant, and an integrated value (52) of a position error between the current and the commanded positions to suppress limit cycle after the interval. A PWM signal (56–57) is derived from the control signal and position pulses (62 or 63) representative of a variation in the current position. Preferably, small-amplitude limit cycle is forced to occur during the interval with the positional error indicated by a modified signal (182) derived by adding unity to positive and zero position errors.

7 Claims, 22 Drawing Figures

SERVO CONTROL SYSTEM OPERABLE ON DIGITAL BASIS WITH LIMIT CYCLE SUPPRESSED

BACKGROUND OF THE INVENTION

This invention relates to a servo control system responsive in general to a sequence of position commands supplied from an external source for intermittently and controllably driving a motor, with rotation of the motor fed back, to position a movable element at successively commanded positions substantially at rest. More particularly, this invention relates to a digital servo control system for use in a position control or positioning control system for either a carriage of a serial printer of the type known as an impact type in the art or a type wheel, drum, or cylinder carried by the carriage.

As will be described later with reference to a few of various figures of the accompanying drawing, an impact type serial printer is for use in combination with an electronic digital computer and comprises a carriage, a carriage motor for linearly moving the carriage along a predetermined path in either of two senses along the path, and a position control system for controllably driving the motor so as to successively and intermittently position the carriage at rest at positions commanded by the computer along the path. A rotary type wheel carrying a plurality of type elements is mounted on the carriage together with a type wheel motor for rotating the type wheel in either of two senses of rotation. A similar position control system controllably drives the type wheel motor so as to intermittently position the type wheel at rest at desired angular or rotational positions commanded also by the computer. Successively selected type elements are thereby placed at a common printing position predetermined relative to the carriage.

A position control system for controllably positioning a movable element, such as the carriage or the type wheel mentioned above, to a commanded position comprises an increment encoder or position transducer mechanically or otherwise coupled to a motor for the element. It is already known in the art to make the encoder produce a pair of incremental position signals having polarities that vary with a phase difference therebetween in response to every predetermined incremental angle of rotation of the motor. The successive variations in the polarity therefore correspond to a variation in the present or instantaneous angular position of the motor and hence the present linear or angular position of the movable element. The phase difference indicates one of a plus or positive and a minus or negative sense in which the present position is varying. The rate at which the polarities vary is proportional to a present angular velocity of the motor and accordingly the present linear or angular velocity of the element. The position signals are subtracted from the command signal to provide a position error between the present and the commanded positions. The motor is controlled so as to reduce the position error to zero.

In U.S. Pat. No. 3,954,163 issued to Andrew Gabor, a position control system for an impact serial printer is disclosed wherein either of a motor for a carriage and another motor for a rotary print wheel is controllably driven at first in a velocity control mode and then in a position control mode on moving the movable element intermittently from each commanded position to a next following commanded position. In the velocity control mode, the motor is driven to follow a reference angular velocity selected in consideration of the position error and represented by an analog reference velocity signal. This mode of operation is continued until the element is driven from a commanded position to a point spaced a predetermined length from the next following commanded position. In the position control mode, the motor is driven at a velocity related to an analog position error signal representative of the position error to eventually position the element at rest at the next following commanded position.

The use of analog signals in a servo control system used in such a position control system makes it difficult to achieve expectedly excellent results in operation and maintenance. Furthermore, it is rendered difficult to provide a compact servo control system. This means that the servo control system becomes bulky and expensive.

Shigeru Shimonou and Hiroshi Inada, assignors to the instant assignee, of whom Hiroshi Inada is one of the present joint inventors, have previously proposed a position control system in a copending patent application Ser. No. 911,263 filed May 31, 1978. The counterpart patent application in Germany was published in "Offenlegungsschrift" No. 28 23 571 on Mar. 1, 1979. It was believed that a servo control system used in the previously proposed position control system was much improved in these respects and, in fact, really is. The previous servo control system, however, is not operable completely on a digital basis. It is to be noted here that a digital servo control system suffers from a phenomenon called limit cycle. As will be discussed later with reference to a few of the various figures of the accompanying drawing, the limit cycle degrades performance of a digital servo control system.

SUMMARY OF THE INVENTION

It is therefore an object of the present invention to provide a servo control system operable entirely on a digital basis with the undesirable phenomenon of limit cycle suppressed.

It is another object of this invention to provide a servo control system of the type described, which is operable at high speed and with high precision.

It is still another object of this invention to provide a servo control system of the type described, which is simple in structure, compact, and inexpensive.

It is possible to manufacture essential parts of a servo control system according to this invention as an integrated circuit.

A digital servo control system to which this invention is applicable is responsive to a command signal indicative of a commanded position of a movable element and a pair of incremental position signals having polarities variable with a phase difference therebetween in response to a predetermined incremental angle of rotation of a motor rotatable with a variable angular velocity to vary the present position of the element, for producing a motor drive signal for controllably driving the motor to position the element at the commanded position. The angular velocity has either of two senses at a time. The phase difference represents the sense of the angular velocity. The system comprises position pulse producing means responsive to the incremental position signals for producing position pulses representative of a variation in the current position. According to this invention, the system comprises control signal producing means responsive to the command signal and the position pulses for calculating a displacement from the current position to the commanded position and for producing a control signal digitally representative of a reference angular velocity selected for the motor in consideration of the displacement until an instant at which the displacement is reduced in absolute value to a predetermined value, a first positional error determined by the displacement during a prescribed interval of time following the above-mentioned instant, and a second positional error having a value increasing in absolute value with relation to the displacement when a predetermined interval of time lapses after the above-described instant. The prescribed interval is not longer in duration than the predetermined interval. The movable element is positioned substantially at the commanded position within the predetermined interval. The servo control system further comprises motor drive signal producing means responsive to the control signal and the position pulses for producing the motor drive signal.

DESCRIPTION OF THE PREFERRED EMBODIMENTS

Figure 1:
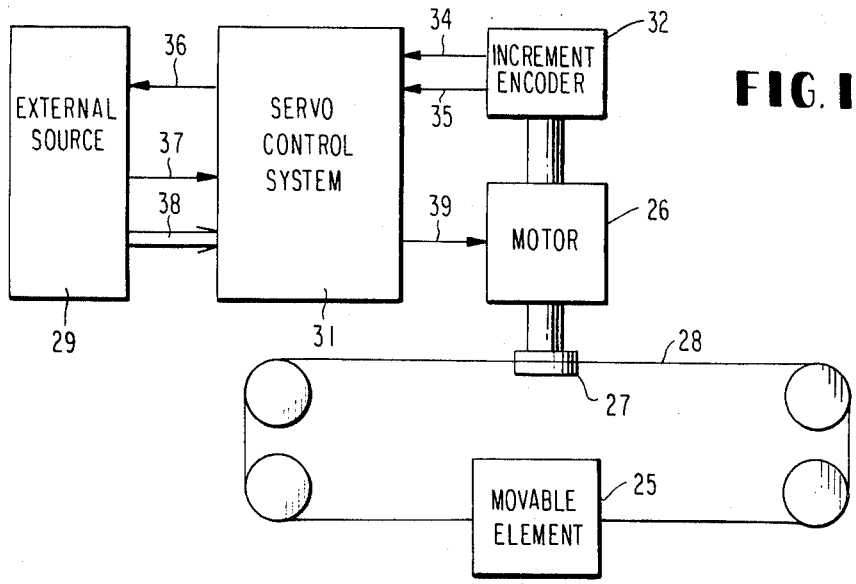
FIG. 1 illustrates in blocks a servo control system to which the instant invention is applicable, together with a movable element, a motor, a command signal generator, and an increment encoder.

It is to be noted at the outset that signals and lines for transmitting the respective signals are often designated by the same reference characters in the following description.

Referring to FIG. 1, a servo control system to which the present invention is applicable is for use in a position control system accompanied by a movable element 25, such as a carriage of a serial printer of the impact type, and a motor 26 for controllably driving an axle or shaft thereof with a variable angular velocity. Merely for convenience of illustration, the axle is depicted as passing through the motor 26. The axle is coupled to the element 25 by means of a driving pulley 27 fixed to the axle and a wire or belt 28 is driven by the driving pulley 27. The motor 26 thus controllably varies the present or instantaneous position of the element 25. The position control system is for use in combination also with a command signal generator or external source 29, such as an electronic digital computer, for producing a digital command signal indicative in general of successively commanded positions of the element 25. It is possible to assume without loss of generality that the motor axle is kept in a predetermined direction. The "angular velocity" as called herein is therefore specified only by its magnitude and sense. It is to be remembered furthermore that the expressions are used herein such that the "motor" 26 is rotatable in one or the other sense at a time and the like.

Further referring to FIG. 1, the position control system comprises a servo control system 31 and an increment encoder or position transducer 32, which is mechanically or otherwise coupled to the motor 26 to produce a pair of incremental position signals 34 and 35 of the type described in the preamble of the instant specification and supplies the same to the servo control system 31. The command signal for each commanded position or end point is produced by the command signal generator 29 in response to a new-data request signal 36 supplied thereto from the servo control system 31 in the manner described later and consists of a sense signal 37 and a distance signal 38, which are supplied to the servo control system 31. The distance signal 38 is usually representative of a distance of the end point from the next previous commanded position or start point and consists of a predetermined number of bits, such as eleven bits. The sense signal 37 indicates one of a plus or positive and a minus or negative sense, such as counterclockwise and clockwise senses, of rotation of the motor 26 at a time and may be an additional bit, such as a twelfth bit, of the command signal 37-38. Responsive to the command signal 37-38 and the incremental position signals 34 and 35, the servo control system 31 supplies a motor drive signal 39 to the motor 26 to make the same move the movable element 25 eventually to the end point as will be described hereunder.

Figure 2:
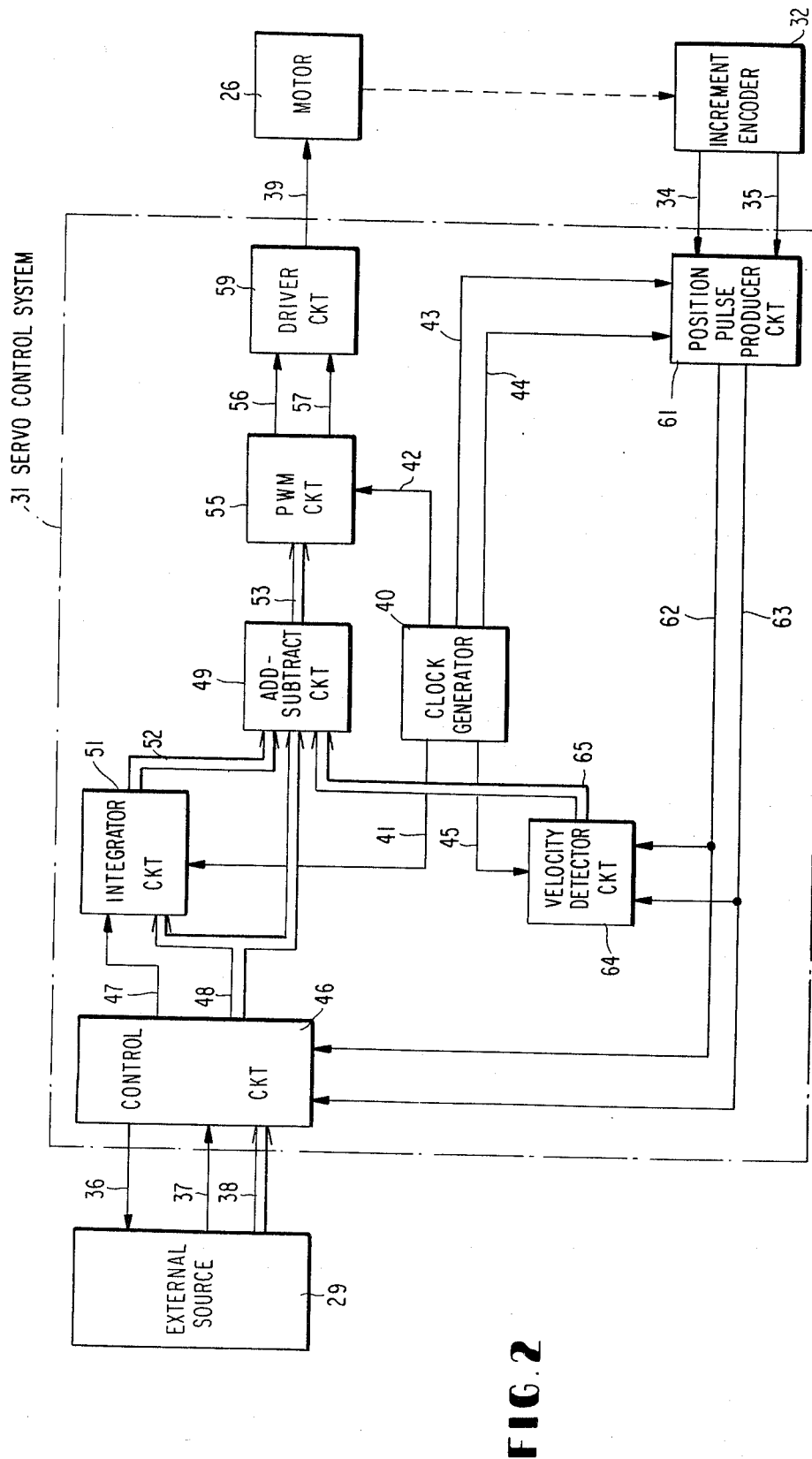
FIG. 2 is a block diagram showing a servo control system according to a first embodiment of this invention, together with the motor, the command signal generator, and the increment encoder.

Referring to FIG. 2, a servo control system 31 according to a first embodiment of this invention comprises a clock generator circuit 40 for generating several clock pulse sequences, such as an integration clock pulse sequence 41, a pulse width modulation (PWM) clock pulse sequence 42, a pair of reference clock pulse sequences 43 and 44, and a sampling clock pulse sequence 45. The repetition frequencies or clock rates of the respective clock pulse sequences 41 through 45 will be exemplified later. Let it now be presumed that the sense signal 37 indicates the positive sense of rotation of the motor 26. When produced, the sense and the distance signals 37 and 38 are stored in a control circuit 46. The control circuit 46 produces a mode signal 47 that indicates at first the velocity control mode described in the preamble of the instant specification. The control circuit 46 produces also a digital control signal 48 representative of one of a plurality of reference angular velocities predetermined for the motor 26 that is selected in consideration of the position error, mentioned also hereinabove, now given by the distance signal 38 by itself. The control signal 48 is supplied to an add-subtractor circuit 49 and an integrator circuit 51, of which the latter circuit 51 is primarily for integrating the integration clock pulse 41. The integrator circuit 51, however, keeps an integrator output signal 52 thereof at zero in the velocity control mode rather than actually carrying out the integration. The add-subtract circuit 49 produces an algebraic sum signal 53 that is representative at present of the selected reference angular velocity as will become clear as the description proceeds. By the use of the PWM clock pulses 42, a pulse width modulator (PWM) circuit 55 carries out pulse width modulation of the algebraic sum signal 53 to deliver a modulator output signal alternatingly to two modulator output leads 56 and 57. The signals supplied to the individual leads 56 and 57 will herein be called a positive and a negative output signal, respectively. Supplied with the positive and the negative output signals 56 and 57, a driver circuit 59 makes the motor driver signal 39 drive the motor 26 in the positive sense with its present angular velocity increased towards the selected reference angular velocity.

As soon as the motor 26 begins to rotate in the positive sense, the increment encoder 32 depicted also in FIG. 2 produces the incremental position signals 34 and 35 representative of the positive sense of rotation by the phase difference therebetween and of the current angular velocity by the increasing pulse rate. Detecting the phase relation and the pulse rate with reference to the reference clock pulse sequences 43 and 44, a position pulse producer circuit 61 produces a sequence of plus or positive position pulses 62. The position pulse producer circuit 61 produces pulses of a minus or negative position pulse sequence 63 when the motor 26 is rotating in the negative sense. In whichever of the sequences 62 and 63, the magnitude of the current angular velocity of the motor 26 is represented by a variable pulse interval $T_i$ of the pulses 62 or 63. Responsive to the positive position pulses 62 and the sampling clock pulse sequence 45, a velocity detector circuit 64 produces a velocity signal 65 representative of the present angular velocity. In the control circuit 46, the pulses of the positive position pulse sequence 62 are subtracted from the distance signal 38. The difference represents the position error. It is possible to understand that the calculation is for deriving a displacement from the present position of the motor 26 or the movable element 25 to the commanded position thereof. Inasmuch as the displacement has a predetermined direction, the displacement is defined by a magnitude and either of a positive or a negative sense. The magnitude is given by the difference. As will become clear as the description proceeds, the sense is given by the sense signal 37 for the time being. With reference to the position error, the reference angular velocity is stepwise reduced in general. In the meantime, the velocity signal 65 is subtracted in the add-subtractor circuit 49 from the reference angular velocity to make the present angular velocity of the motor 26 follow the reference angular velocity. The velocity detector circuit 64 and the add-subtractor circuit 49 thus provide velocity feedback.

When the displacement calculated in the control circuit 46 illustrated in FIG. 2 decreases in absolute value to a predetermined value, the mode signal 47 begins to indicate the position control mode described in the preamble of the instant specification. The digital control signal 48 now represents the position error instead of the reference angular velocity. As will become clear later, the position error has either a positive or a negative sign in the position control mode. The sense of displacement is given by the sign. The integrator circuit 51 does not yet carry out the integration. The velocity detector circuit 64 and the add-subtractor circuit 49 provide velocity feedback, which now serves as damping. The integrator circuit 51 being to carry out the integration a predetermined interval of time after an instant at which the mode signal 47 is switched to indicate the position control mode for suppressing the limit cycle as will presently become clear. It may be mentioned here that the motor 26 is driven within the predetermined interval substantially to the commanded position. The predetermined interval may, for example, be several milliseconds long.

Figure 3:
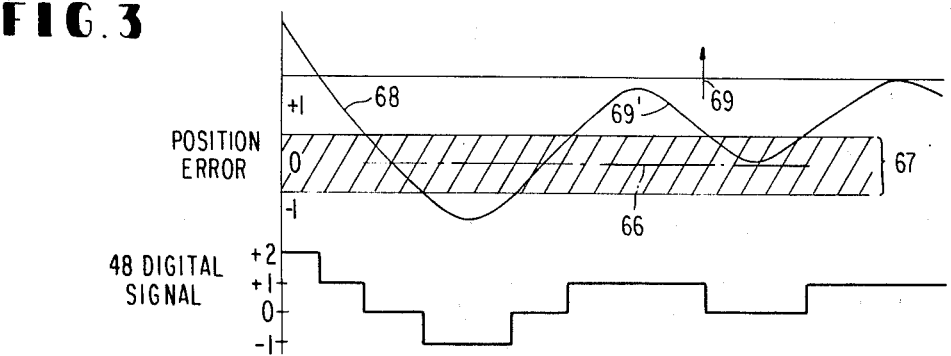
FIG. 3 is a graph showing a few signals for describing the limit cycle that appears in a general digital servo control system.

Turning to FIG. 3, let it be surmised that the movable element 25 and consequently the motor 26 should be positioned at a commanded position 66 shown in the top row of the figure. Because of the digital operation, the increment encoder 32 specifies the commanded position 66 as a dead band or zone 67 having a width inversely proportional to the number of the positive or the negative position pulses 62 or 63 produced by the position pulse producer circuit 61 per one complete rotation of the motor 26. When the position error decreases as exemplified in the left end portion of the top row at 68, the motor 26 is decelerated towards a stop. The velocity signal 65 is very small. The digital control signal 48 representative of the position error of the values +2 and +1 is therefore successively fed back in approximation to the motor 26. When the position error is further reduced into the dead zone 67, the motor 26 receives no force from the servo control system 31. Due to the inertia, the position error becomes −1 and then tends to transiently oscillate between +1 and −1 before the motor 26 is positioned eventually at rest at the commanded position 66. If an external force is applied to the motor 26 during the transient oscillatory rotation thereof in, for example, the positive sense indicated at 69 from the motor brushes (not shown) and/or the movable element driving mechanism comprising the wire 28, the transient oscillation lasts for a relatively long time at least between +1 and 0 as depicted at 69′ with a peak-to-peak value approximately equal to two in terms of the number of pulses of the positive or the negative position pulses 62 or 63. This phenomenon is called the limit cycle and gives rise to unpleasant noise.

Figure 4:
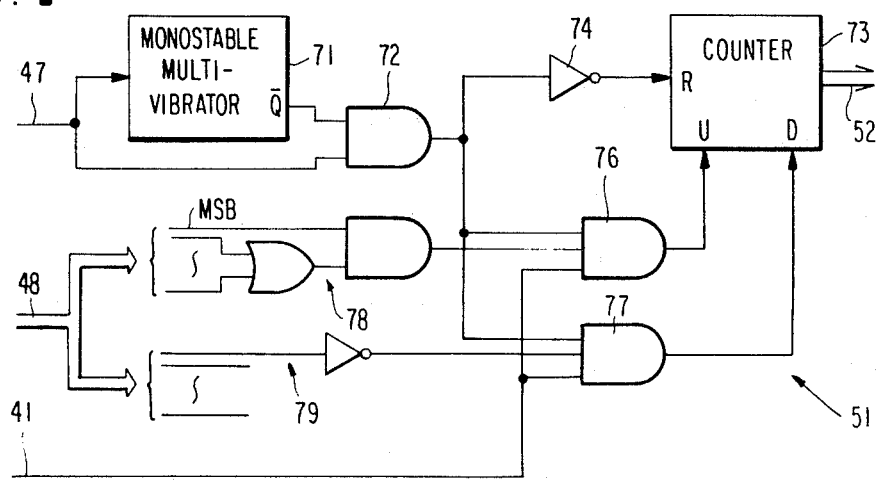
FIG. 4 is a block diagram of an integrator circuit used in the system depicted in FIG. 2.

Referring now to FIG. 4, an example of the integrator circuit 51 comprises a monostable multivibrator 71 supplied with the mode signal 47 for delivering a reversed output signal from an inverse output terminal $\overline{Q}$ thereof to one of two inputs of a two-input AND gate 72. The mode signal 47 is supplied directly to the other input of the AND gate 72. Let the mode signal 47 indicate the velocity and the position control modes by a logic "0" (low) and a logic "1" (high) level, respectively, throughout the following description related also to FIGS. 5 through 22. The reversed output signal is switched from the logic "0" level to the logic "1" one a predetermined interval of time after the above-mentioned instant. The AND gate 72 supplies a logic "1" signal to a reset input terminal R of an integraton counter 73 through an inverter 74 and a logic "0" signal directly to one input each of first and second three-input AND gates 76 and 77 during the time that the mode signal 47 indicates the velocity control mode and during the predetermined time interval. In the meanwhile, the counter 73 is kept in the reset state to maintain the integrator output signal 52 zero.

In FIG. 4, a first detector 78 supplies a logic "1" signal to a second input of the first AND gate 76 in response to the digital control signal 48 when the signal 48 represents a number equal to +1 or greater. Likewise, a second detector 79 delivers a logic "1" signal to a second input of the second AND gate 77 when the digital control signal 48 is representative of a number equal to −1 or less. The AND gates 76 and 77 are thus enabled, in the position control mode, when the position error is equal to +1 or greater and equal to −1 or less, respectively. The integration clock pulses 41 are supplied to a third input each of the AND gates 76 and 77. When put into operation after the lapse of the predetermined interval, the counter 73 counts up and down the integration clock pulses 41 supplied to count up and down terminals U and D thereof through the enabled first and second AND gates 76 and 77, respectively, to give the integrator output signal 52 an increasing or decreasing value rather than zero. Let the most significant bit (MSB) of the digital control signal 48 serve as a sign bit for indicating the sign of the position error in the position control mode. The first detector 78 may comprise an AND gate responsive to the most significant bit of the digital control signal 48 and an OR'ed output of the signal 48 except the most significant bit. The second detector 79 may comprise an inverter for the most significant bit. The integrator circuit 51 thus carries out integration of the position error in the sense or sign that the position error has.

Figure 5:
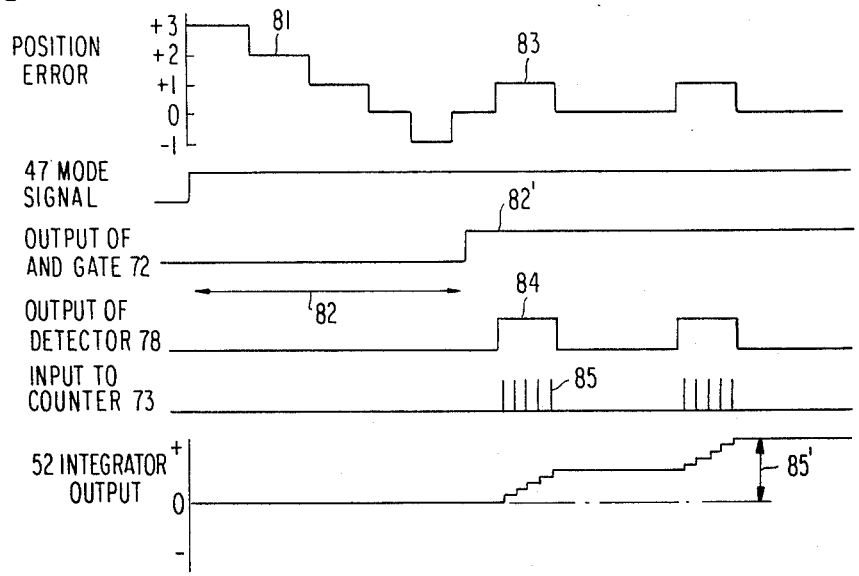
FIG. 5 is a timing chart diagrammatically showing several signals for describing the operation of the integrator circuit shown in FIG. 4.

Referring to FIG. 5, it is now presumed that the servo control system 31 is switched from the velocity control mode to the position control mode when the absolute value of the displacement decreases from four to three. The digital control signal 48 now indicates the position error that decreases as depicted at 81 along the top row. The mode signal 47 is switched from the logic "0" level to the logic "1" level as shown in the next row. When a predetermined interval of time 82 lapses after the mode signal 47 is switched to the logic "1" level, the two-input AND gate 72 produces a logic "1" signal 82'. In the meantime, the position error is reduced to zero. The limit cycle, however, appears as depicted at 83 in the top row. The first detector 78 intermittently produces logic "1" signals 84 to enable the first three-input AND gate 76. The integration clock pulses 41 are therefore supplied to the count up terminal U of the integration counter 73 as shown at 85. The integrator output signal 52 is thus given a stepwise rising level. The limit cycle is suppressed when the external force is balanced by the torque produced by the motor 26 in response to the integrator output signal 52 of a certain level exemplified at 85'. It is thereby possible to position the movable element 25 quickly at the commanded position 66.

Figure 6:
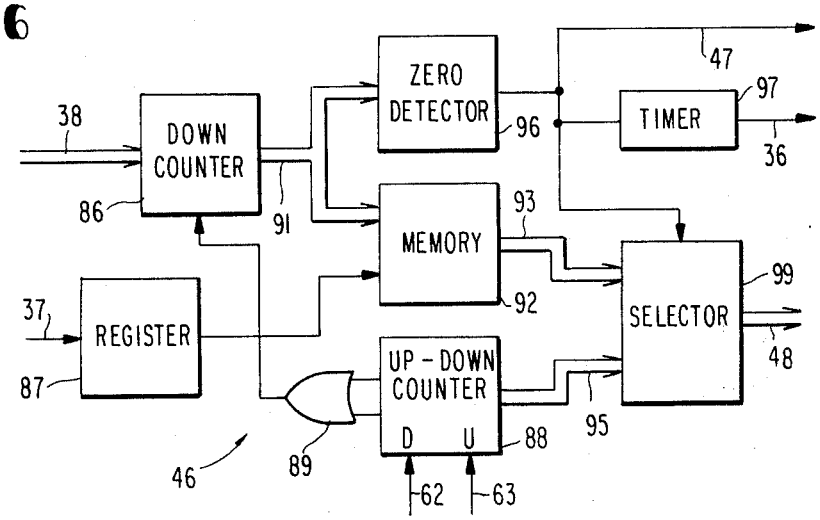
FIG. 6 is a block diagram of a control circuit used in the system illustrated in FIG. 2.

Turning to FIG. 6, an example of the control circuit 46 is equivalent to the circuit illustrated in the copending patent application referred to hereinabove with reference to FIG. 3 and comprises a down counter 86 in which the distance signal 38 is set as an initial count. A register 87 is for storing the sense signal 37. An up-down counter 88 counts down the positive position pulses 62 and counts up the negative position pulses 63 to supply carry down and up pulses to the down counter 86 through an OR gate 89. Responsive to either of the carry down and up pulses, the down counter 86 counts down the initial count to produce a first position error signal 91 representative of the magnitude of the above-mentioned displacement in terms of the unit for the distance signal 38 with the sense thereof given by the sense signal 37 stored in the register 87. A combination of the sense signal 37 and the first position error signal 91 is used to specify an address of a memory 92 in which are stored several reference angular velocity signals. Addressed by these signals 37 and 91, the memory 92 supplies a line 93 with a selected one of the reference velocity signals. When the distance signal 38 is an eleven-bit signal as exemplified hereinabove, the up-down counter 88 is preferably a three-bit counter that produces a second position error signal 95 representative in the position control mode of the magnitude of the displacement in terms of the number of the positive or the negative position pulses 62 or 63 with the sense of the displacement given by the sign of the count in the counter 88.

In FIG. 6, the first position error signal 91 is supplied to a zero detector 96 to make the mode signal 47 indicate the velocity and the position control modes when the first position error signal 91 does not represent and represents zero, respectively. A timer 97 produces the new-data request signal 36 a prescribed interval of time after the instant at which the mode signal 47 is switched from the logic "0" level (velocity control mode) to the logic "1" level (position control mode). Supplied with the mode signal 47 indicative of the velocity control mode, a selector 99 produces the reference angular velocity signal as the digital control signal 48. When the mode signal 47 indicates the position control mode, the selector 99 produces the second position error signal 95 as the digital control signal 48.

In FIG. 6, it is possible to make another zero detector (depicted at 62 in the above-mentioned FIG. 3 of the copending patent application) responsive to the mode signal 47 and the second position error signal 91 produce the new-data request signal 36 when the second position error signal 95 comes to indicate zero in the position control mode. Alternatively, the command signal generator 29 may be programmed to produce, a preselected duration of time after production of the command signal 37-38 for an end point, another command signal 37-38 for a new end point.

Figure 7:
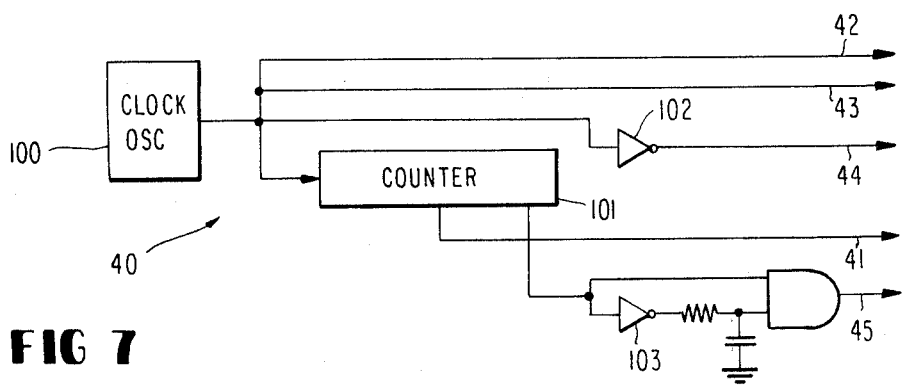
FIG. 7 is a block diagram of a clock generator circuit used in the system shown in FIG. 2.

Turning to FIG. 7, the clock generator circuit 40 preferably comprises a standard clock generator 100 for generating a standard clock pulse sequence at a sufficiently high clock rate. A counter 101 frequency divides the standard clock pulse sequence to provide the integration clock pulse sequence 41. The standard clock pulse sequence is used as the PWM clock pulse sequence 42. The standard clock pulse sequence is used also as one of the reference clock pulse sequences 43. The other reference clock pulse sequence 44 is obtained through an inverter 102. The counter 101 further frequency divides the standard clock pulse sequence to provide a low-rate clock pulse sequence, which is shaped by a shaping circuit 103 into the sampling clock pulse sequence 45. By way of example, the clock rate of the standard clock pulse sequence and accordingly the PWM and the reference clock pulse sequences 42 through 44 is 1 MHz. Those of the integration and the sampling clock pulse sequences 41 and 45 are 10 kHz and 3.3 kHz, respectively.

Figure 8:
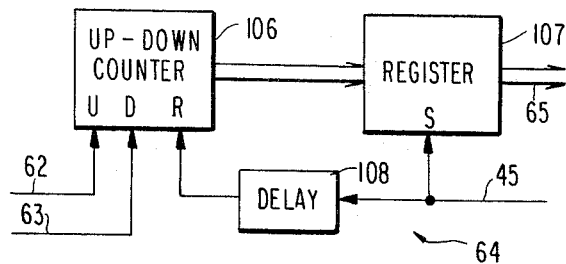
FIG. 8 is a block diagram of a velocity detector circuit used in the system illustrated in FIG. 2.

Referring to FIG. 8, an example of the velocity detector circuit 64 comprises an up-down counter 106 for counting up and down the positive and the negative position pulses 62 and 63, respectively, to deliver a count signal to a register 107. The sampling clock pulses 45 are supplied to a set input terminal S of the register 107 directly and to a reset input terminal R of the counter 106 through a delay circuit 108. When each of the sampling clock pulses 45 appears, the count signal is set or registered in the register 107 to be produced therefrom as the velocity signal 65. Immediately thereafter, the counter 106 is reset. The velocity signal 65 thus represents the number of the positive or the negative position pulses 62 or 63 produced by the position pulse producer circuit 61 within an interval of time determined by the sampling clock pulse sequence 45.

Figure 9:
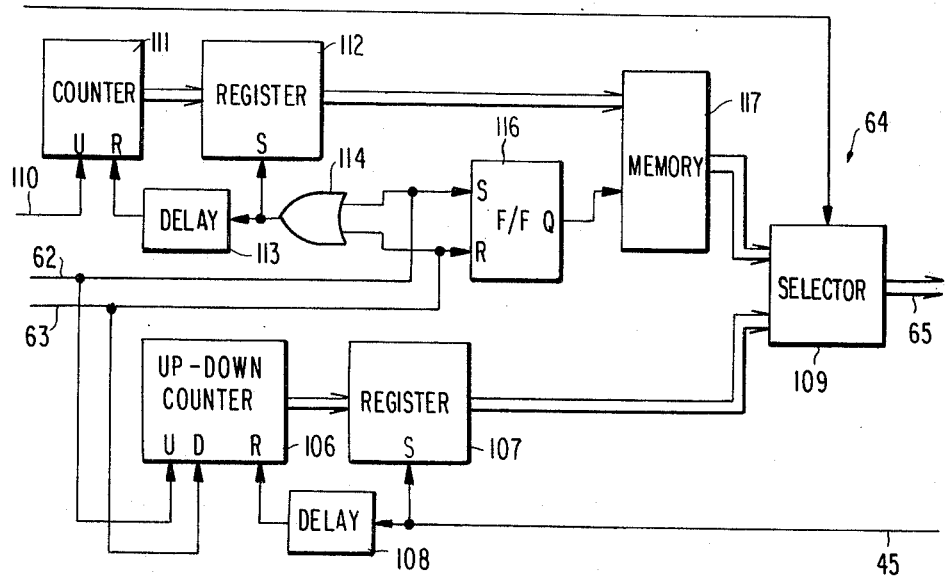
FIG. 9 is a block diagram of another velocity detector circuit for use in the system shown in FIG. 2.

Referring to FIG. 9, another example of the velocity detector circuit 64 comprises an up-down counter 106, a first register 107, and a first delay circuit 108 of the type and operation described in conjunction with FIG. 8. The count signal set in the register 107, however, is produced as the velocity signal 65 through a selector 109 only when the mode signal 47 indicates the position control mode. For the illustrated circuit 64, the clock generator circuit 40 produces a clock pulse sequence 110 (not shown in FIGS. 2 and 7) at a relatively high rate, such as 300 kHz. An up counter 111, a second register 112, and a second delay circuit 113 are similar in operation to the up-down counter 106, the first register 107, and the first delay circuit 108, respectively. The second delay circuit 113, however, is for each of the positive and the negative position pulses 62 and 63 supplied thereto through an OR gate 114. The up counter 111 counts up the relatively high-rate clock pulses 110. The positive and the negative position pulses 62 and 63 set and reset, respectively, a flip-flop circuit 116.

In FIG. 9, the set output signal produced by the flip-flop 116 at a set output terminal Q thereof (alternatively, the reset output signal) and the count signal registered in the second register 112 are supplied to a memory 117 to specify an address therein. As will readily be understood, the signal produced by the second register 112 is representative of the above-described pulse interval $T_i$ and accordingly the inverse of the motor velocity. The memory 117 supplies a signal memorized in the specified address, which signal is produced as the velocity signal 65 through the selector 109 only when the mode signal 47 indicates the velocity control mode. It is now appreciated that the illustrated circuit 64 measures the pulse interval $T_i$ in terms of the relatively high-rate clock pulses 110 in the velocity control mode to detect the motor velocity more exactly. The number of the positive or the negative position pulses 62 or 63 sampled by the sampling clock pulses 45 in the position control mode is for preventing the up counter 111 from overflowing.

Figure 10:
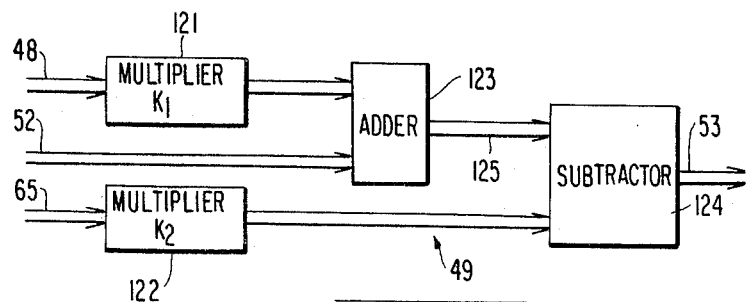
FIG. 10 is a block diagram of an add-subtractor circuit used in the system depicted in FIG. 2.

Referring to FIG. 10, an example of the add-subtract circuit 49 comprises a first multiplier 121 for multiplying the digital control signal 48 by a first factor $K_1$ and a second multiplier 122 for multiplying the velocity signal 65 by a second factor $K_2$. An adder 123 adds the integrator output signal 52 described in specific conjunction with FIG. 4 to the multiplied signal derived from the first multiplier 121. A subtractor 124 subtracts the multiplied signal of the second multiplier 122 from an output signal 125 of the adder 123 to produce the algebraic sum signal 53. The multipliers 121 and 122 correspond to amplifiers of gains $K_1$ and $K_2$. In practice, the multipliers 121 and 122 may shift the respective signals 48 and 65 to provide gains equal to $2^n$, where n represents an integer. The gains $K_1$ and $K_2$ are, for example, 1 (unity) and either 4 or 8, respectively. In this event, the velocity signal 65 is subtracted only from less significant digit or digits of the adder output signal 125. As will readily be understood, the multipliers 121 and 122 may be comprised by the integrator circuit 51 and the velocity detector circuit 64, respectively.

Figure 11:
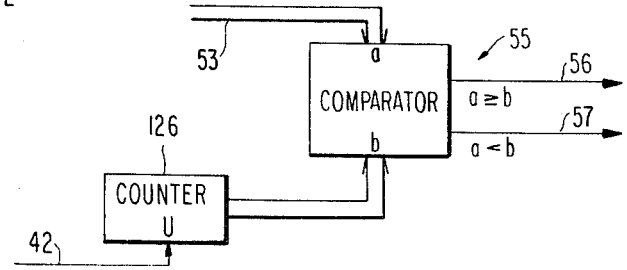
FIG. 11 is a block diagram of a pulse width modulator circuit used in the system shown in FIG. 2.

Referring to FIG. 11, an example of the PWM circuit 55 comprises a counter 126 for counting the PWM clock pulses 42. The count signal derived from the counter 126 serrasoidally oscillates with a count cycle between zero count and the full count. The count cycle is selected so that the repetition frequency of the serrasoidal oscillation may be, for example, 20 kHz. It is readily possible to make the count signal vary between a negative and a positive value having a substantially equal absolute value. A comparator 127 compares the algebraic sum signal 53 supplied to a signal input terminal a thereof with the oscillating count signal supplied to a reference input terminal b. When the algebraic sum signal 53 is not less than and is less than the oscillating count signal, the comparator 127 gives the logic "1" (high) level to the positive and the negative output signals 56 and 57, respectively. The comparator 127 thus gives the logic "1" level to each of the positive and the negative output signals 56 and 57 once in each count cycle of the counter 126. When the algebraic sum signal 53 has a positive level, the duration of the high level of the positive output signal 56 is longer in proportion to the positive level than the duration during which the negative output signal 57 is given the high level. The leads 56 and 57 are thus supplied with a pulse width modulated signal having a pulse width variable in proportion to the algebraic sum signal 53.

Figure 12:
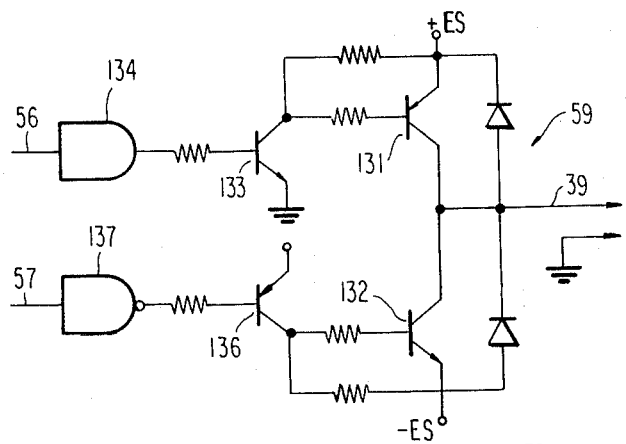
FIG. 12 is a block diagram of a driver circuit used in the system illustrated in FIG. 2.

Referring to FIG. 12, an example of the driver circuit 59 comprises first and second driving transistors 131 and 132 connected in series at a point of connection between positive and negative power supply terminals +ES and −ES. The positive output signal 56 is delivered to an NPN transistor 133 through a gate 134. The negative output signal 57 is supplied to a PNP transistor 136 through an inverter gate 137. When the positive output signal 56 is given the high level, the NPN and the PNP transistors 133 and 136 are rendered conductive and nonconductive, respectively, to turn the first and the second driving transistors 131 and 132 on and off, respectively. As a result, the point of connection is given a power of a voltage approximately equal to the positive power supply voltage +ES. When the negative output signal 57 is rendered high, the point of connection is given a power of a voltage nearly equal to the negative power supply voltage −ES. The power derived at the point of connection thus has an average voltage proportional to the algebraic sum signal 53 and is used as the motor drive signal 39. It should be noted that the motor 26 has an electrical time constant that gives rise to a low-pass phenomenon and defines a cutoff frequency. With the clock rate of the PWM clock pulses 42 selected sufficiently higher than the cutoff frequency as exemplified above, it is possible to render the electric current supplied to the motor 26 proportional to the algebraic sum signal 53.

Figure 13:
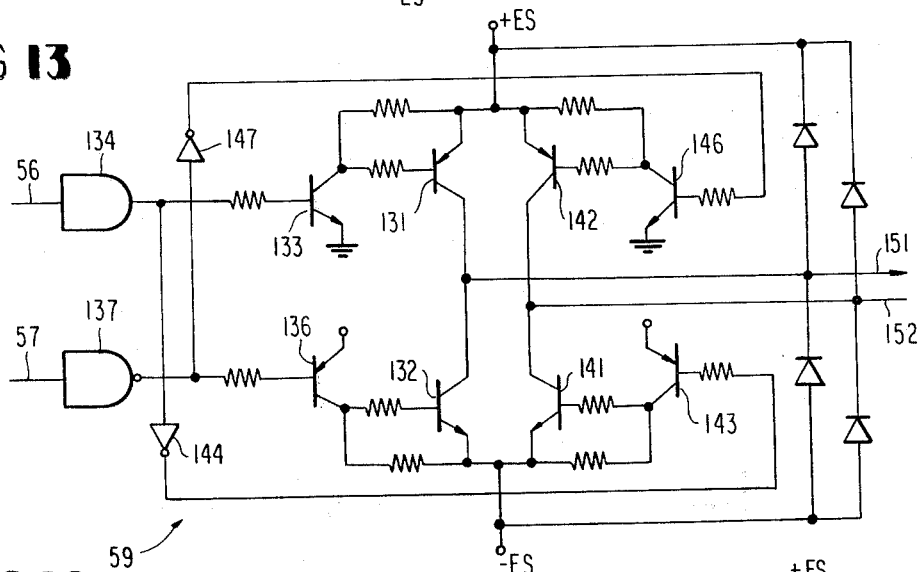
FIG. 13 is a block diagram of another driver circuit for use in the system shown in FIG. 2.

Referring to FIG. 13, another example of the driver circuit 59 is operable in a push-pull fashion and comprises first and second additional driving transistors 141 and 142 connected in series at a second point of connection between the negative and the positive power supply terminals −ES and +ES, in addition to the elements described with reference to FIG. 12 and designated herein by like reference numerals. The positive output signal 56 is supplied to an additional PNP transistor 143 through the gate 134 and an inverter 144. The negative output signal 57 is supplied to an additional NPN transistor 146 through the inverter gate 137 and another inverter 147. When the positive output signal 56 is given the high level, the first driving transistors 131 and 141 are rendered conductive with the second driving transistors 132 and 142 turned off. The motor drive signal 39 thereby produced between connections 151 and 152 connected to the aforementioned point of connection and the second point of connection, respectively, has a voltage nearly equal to +2ES. When the negative output signal 57 is rendered high, the motor drive signal 39 has a voltage near −2ES. The illustrated driver circuit 59 is therefore capable of raising the gain of the servo control system 31 and thereby improving the control characteristics thereof.

Figure 14:
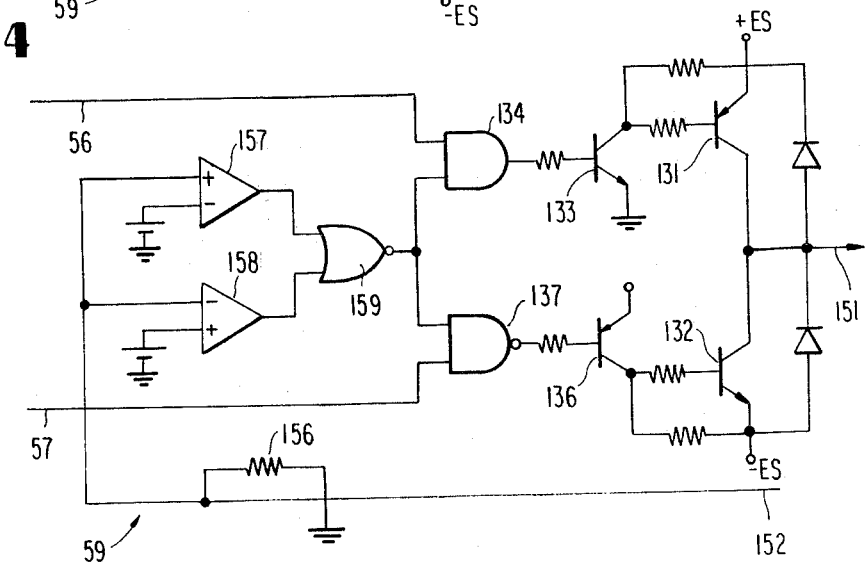
FIG. 14 is a block diagram of still another driver circuit for use in the system shown in FIG. 2.

Referring to FIG. 14, still another example of the driver circuit 59 is specifically adapted to a motor 26 that is subject to demagnetization when the motor drive current exceeds a certain limit. The illustrated circuit 59 comprises similar parts designated again by like reference numerals as in FIG. 12 and, in addition thereto, a resistor 156 interposed between the connection 152 serving as a return conductor for the motor drive current and a point of common potential for detecting the current flowing through the motor 26. The voltage developed across the resistor 156 is compared with a reference voltage selected for the current limit in either of positive and negative comparators 157 and 158. When the motor current is for the positive sense of rotation and tends to exceed the limit, the positive comparator 157 produces a logic "1" (high) signal. The output signals of the comparators 157 and 158 serve to close or disable the gates 134 and 137 through a NOR gate 159 and thereby prevent the motor current from exceeding the limit.

Figure 15:
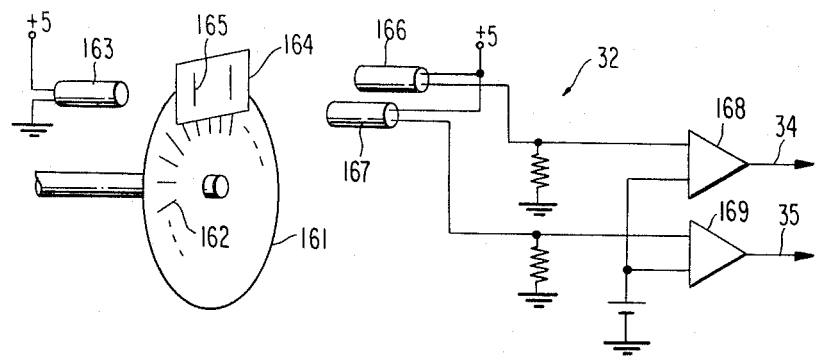
FIG. 15 shows partly in a schematic perspective view and partly in blocks an increment encoder for use in combination with the system illustrated in FIG. 2.

Turning now to FIG. 15, which is a substantial reproduction of FIG. 8 of the above-mentioned copending patent application, an example of the increment encoder 32 comprises an opaque disk 161 mechanically coupled to the motor axle to be rotatable with the motor 26 and having azimuthally equally spaced radial slits or position information patterns 162. The azimuthally equal spacing of the radial slits 162 is determined in consideration of the predetermined incremental angle of rotation of the motor 26. The number of the radial slits 162 may, for example, be six hundred. A light source 163 is for illuminating the radial slits 162. A fixed opaque plate 164 has a pair of slits 165 with which two of the radial slits 162 are successively brought into alignment as the motor 26 rotates. The slit pair 165 is spaced from each other by a distance that is different from the azimuthally equal spacing by a quarter. A pair of optical sensors 166 and 167 is aligned with the slit pair 165 to produce intermittent pulses at a rate related to the angular speed of rotation of the opaque disk 161. The intermittent pulses are shaped into the incremental position signals 34 and 35 by a pair of comparators 168 and 169 supplied with a common reference voltage.

Figure 16:
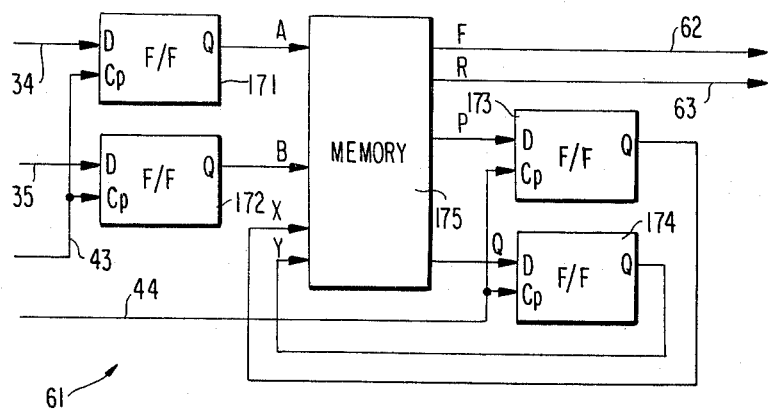
FIG. 16 is a block diagram of a position pulse producer circuit used in the system shown in FIG. 2.

Referring to FIG. 16, an example of the position pulse producer circuit 61 comprises first and second flip-flops 171 and 172 having data input terminals D to which the incremental position signals 34 and 35 are supplied, respectively. One of the reference clock pulse sequences 43 is supplied to clock input terminals Cp of the flip-flops 171 and 172. The other reference clock pulse sequence 44 is supplied to clock input terminals Cp of third and fourth flip-flops 173 and 174. Output signals A and B derived at Q output terminals of the first and the second flip-flops 171 and 172 are used as a first pair of address signals for a memory 175. Two output signals P and Q thereby read out of the memory 175 are supplied to data input terminals D of the third and fourth flip-flops 173 and 174, respectively. The first and the second flip-flops 171 and 172 thus sample the incremental position signals 34 and 35 with the above-mentioned one reference clock pulse sequence 43. Output signals X and Y similarly sampled by the third and the fourth flip-flops 173 and 174 by the use of the other reference clock pulse sequence 44 from the signals P and Q read out of the memory 175 are used as a second pair of address signals for the memory 175. Two other signals F and R are read out of the specified address.

In FIG. 16, signals are stored in the memory 175 so that the read-out signals F and R may be given by logic equations:

$$F = A.\overline{X}.\overline{Y} + \overline{A}.X.Y + B.X.\overline{Y} + \overline{B}.\overline{X}.Y$$

and $$R = A.\overline{X}.Y + \overline{A}.X.\overline{Y} + B.\overline{X}.\overline{Y} + \overline{B}.X.Y,$$

when P=A and Q=B. It is thereby possible to make the build up and down of the incremental position signals 34 and 35 produced during positive rotation of the motor 26 produce one of the read-out signals F that serves as the positive position pulses 62. Similarly, the build up and down of the incremental position signals 34 and 35 produced when the motor 26 is driven in the negative sense results in the other read-out signal R that serves as the negative position pulses 63.

With respect to FIG. 16, it is to be noted that the position pulse producer circuit 61 can comprise hardware logic (not shown) as detailed in the referenced copending patent application with reference to either FIG. 10 or FIG. 11.

Figure 17:
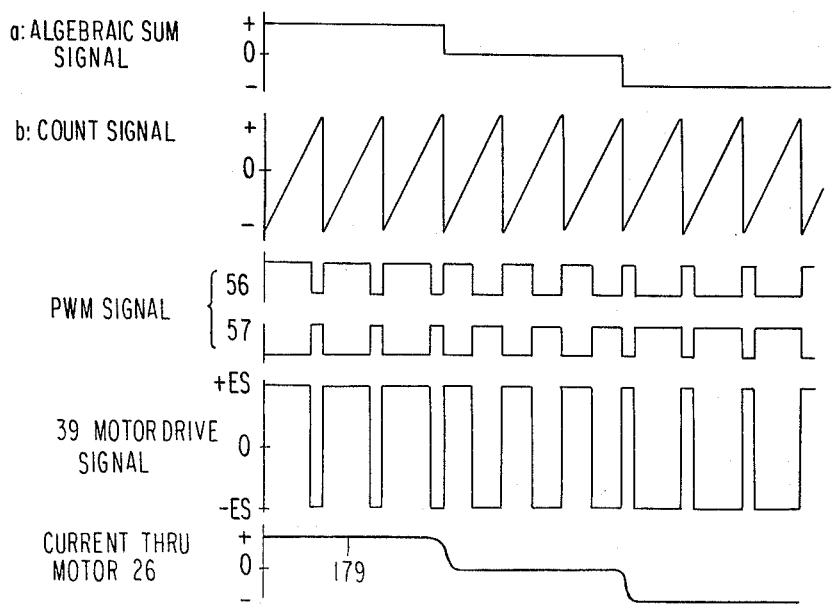
FIG. 17 is a timing chart diagrammatically showing several signals for describing the operation of the pulse width modulator circuit and the driver circuit illustrated in FIG. 11 and FIG. 12 or 14, respectively.

Referring to FIG. 17, let it be presumed that the algebraic sum signal 53 supplied to the signal input terminal a of the comparator 127 varies as exemplified along the top row. The count signal supplied to the reference input terminal b of the comparator 127 oscillates as shown in the next row when depicted as an analog signal merely for simplicity of illustration. Under the circumstances, the positive and the negative output signals 56 and 57 vary as illustrated along the two next subsequent rows. The motor drive signal 39 varies as shown along the next to last row. The drive signal 39 varies between +2ES and −2ES when the driver circuit 59 illustrated with reference to FIG. 13 is used. In any event, the current flowing through the motor 26 becomes as exemplified in the bottom row at 179 as a result of the low-pass phenomenon of the motor 26.

Reviewing FIGS. 2, 8 through 14, and 17, it is possible to understand depending on the circumstances that the PWM circuit 55, the driver circuit 59, the velocity detector circuit 64, and the substractor 124 serve as a motor drive signal producing device responsive to a control signal 125 produced by the adder 123 and the position pulses 62 or 63 supplied through the velocity detector circuit 64 for producing the motor drive signal 39. The velocity detector circuit 64 and the subtractor 124 cooperate as an input signal producing device responsive to the control signal 125 and the position pulses 62 or 63 for supplying the PWM circuit 55 with an input signal having a level variable in response to the control signal 125 and the pulse interval $T_i$ of the position pulses 62 or 63.

Figure 18:
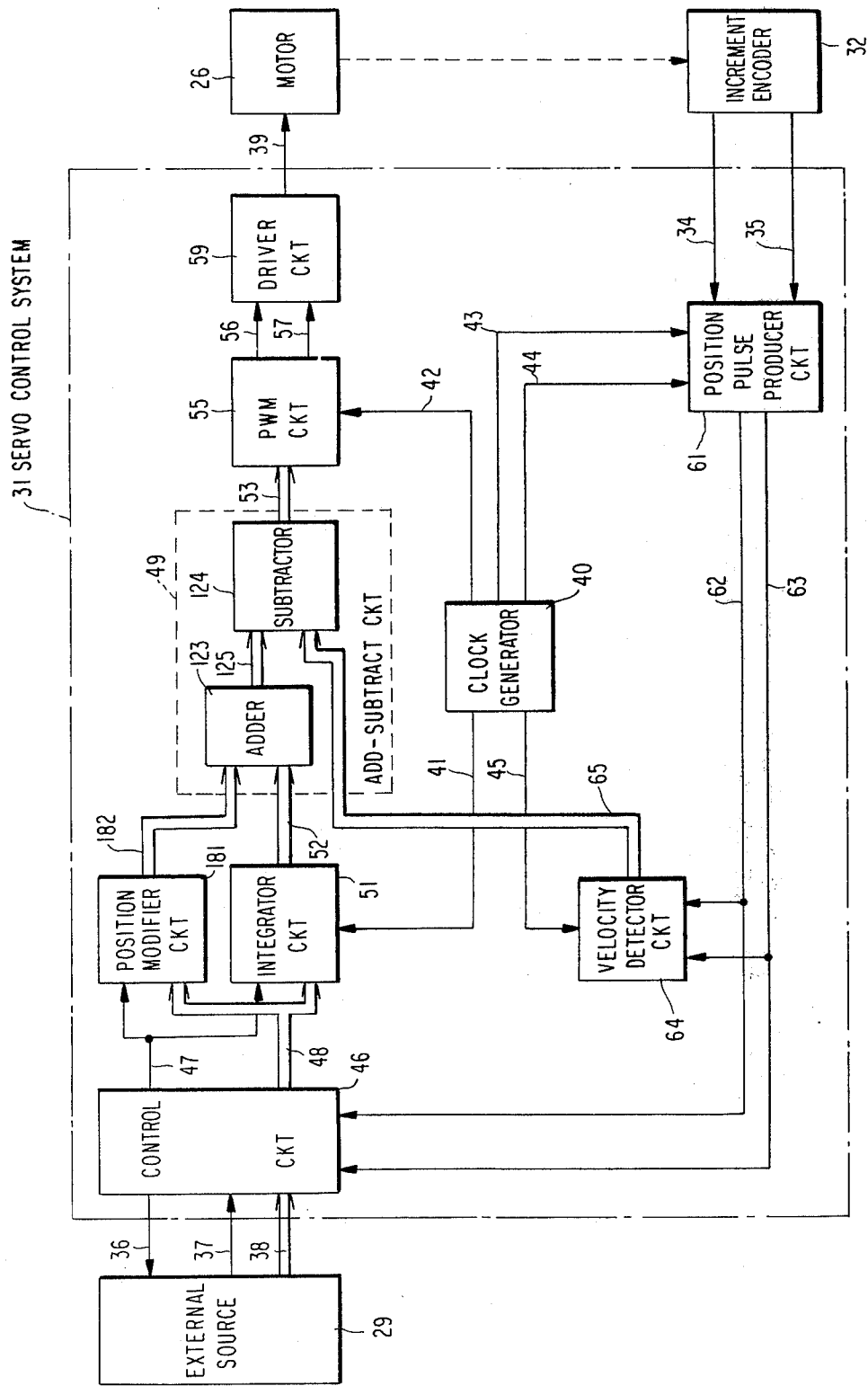
FIG. 18 shows in blocks a servo control system according to a second embodiment of this invention, together with the motor, the command signal generator, and the increment encoder depicted in FIGS. 1 and 2.
Figure 19:
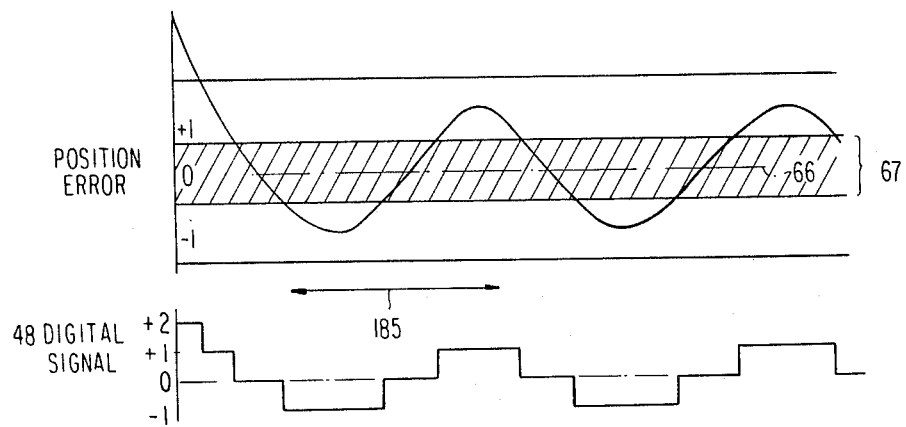
FIG. 19 is a graph illustrating several signals for describing the operation of the system depicted in FIG. 2.

Turning now to FIG. 18, a servo control system 31 according to a second embodiment of this invention comprises similar parts designated by like reference numerals as in FIG. 2 and is operable with similar signals. The digital control signal 48, however, is delivered from the control circuit 46 to a position modifier circuit 181 to which the mode signal 47 is also supplied. In the velocity control mode, the position modifier circuit 181 supplies the digital control signal 48 to the add-subtract circuit 49 as a "modified" position signal 182 without any modification.

During a prescribed interval of time after the instant at which the mode signal 47 begins to indicate the position control mode, the position modifier circuit 181 produces the modified position signal 182 with one or unity added to those values of the position error represented by the digital control signal 48 which are not negative. In the meantime, the integrator output signal 52 is kept at zero. The velocity signal 65 to be subtracted in the add-subtract circuit 49 from the modified position signal 182 is nearly equal to zero at this instant. The motor 26 is therefore driven approximately in compliance with the modified position signal 182 to stably oscillate, as will shortly be discussed, near a specific point bisecting a range wherein the position error has only two values 0 and −1 in terms of the unit used in the digital control signal 48. The limit cycle is thus forcibly given rise to, with the dead zone excluded from the position error, temporarily during the prescribed interval. The specific point will be referred to as an objective position.

Further referring to FIG. 18, the position modifier circuit 181 delivers the digital control signal 48 again without any modification to the add-subtract circuit 49 as the "modified" position signal 182 after lapse of the prescribed interval. The modified position signal 182 again represents the position error accompanied by the dead zone. The integrator circuit 51 is put into operation. The illustrated servo control system 31 therefore operates under the circumstances in a manner quite similar to that described in conjunction with FIG. 2. It is now understood that the interval prescribed for the position modifier circuit 181 is not longer in duration than the interval predetermined for the integrator circuit 51. In practice, the intervals may be equal to each other. It is also appreciated that the forced limit cycle does not matter because the limit cycle lasts only for several milliseconds.

In connection with FIG. 18, it may be pointed out here that printing is carried out in a high-speed impact-type serial printer at an earlier instant every time after the servo control system 31 is put into the position control mode. By the use of the forced limit cycle accompanied by no dead zone, the carriage and the type wheel are positioned more exactly at the successive objective positions at the respective instants of printing.

Referring to FIG. 19, let it be again presumed as in FIG. 3 that the motor 26 should be positioned at a commanded position 66. Herein, the width of the transient oscillation is between +1 and −1 in terms of the position error. In the high-speed printer, printing is carried out at an instant within an interval exemplified at 185 before the motor 26 is positioned at rest at the commanded position 66. To reduce the width of the oscillatory rotation of the motor 26, it is necessary to raise the resolving power of the increment encoder 32. This renders the position control system expensive.

Figure 20:
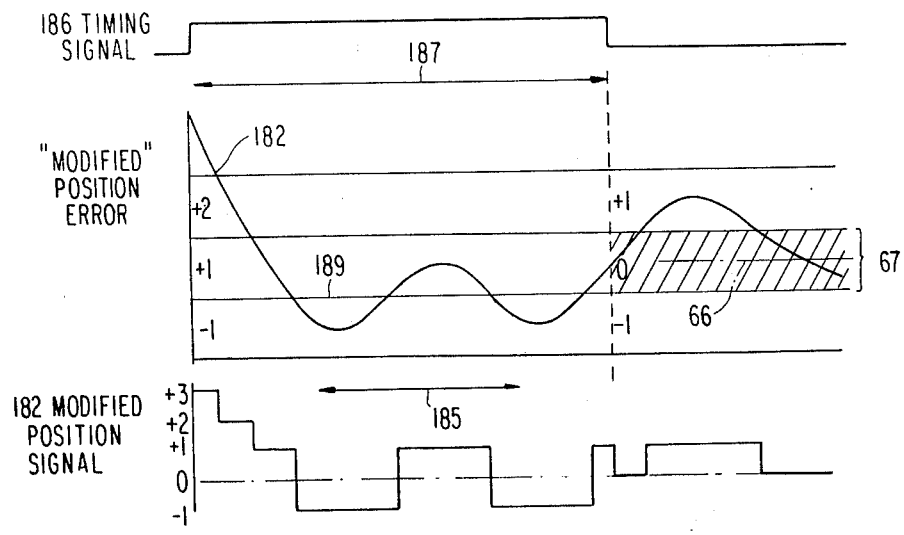
FIG. 20 is a graph showing several signals for describing the operation of the system shown in FIG. 18.

Referring to FIG. 20, a timing signal 186 shown along the top row is used to specify a prescribed interval of time 187 mentioned in conjunction with FIG. 18. During the prescribed interval 187, the values successively represented by the modified position signal 182 are labelled in the lower rows instead of the position error represented by the digital control signal 48 accompanied by the dead zone 67. The objective position is indicated at 189. Inasmuch as the motor 26 is fed back during the prescribed interval 187 approximately with the modified position signal 182 depicted in the bottom row, the limit cycle is forcibly stably caused to occur between +1 and −1 in terms of the values of the modified position signal 182 and accordingly between +1 and 0 in terms of the position error. The motor 26 is therefore oscillatorily positioned near the objective position 189 with about twice as high a precision as attained by the use of the servo control system 31 illustrated with reference to FIG. 2.

Figures 21, 22:
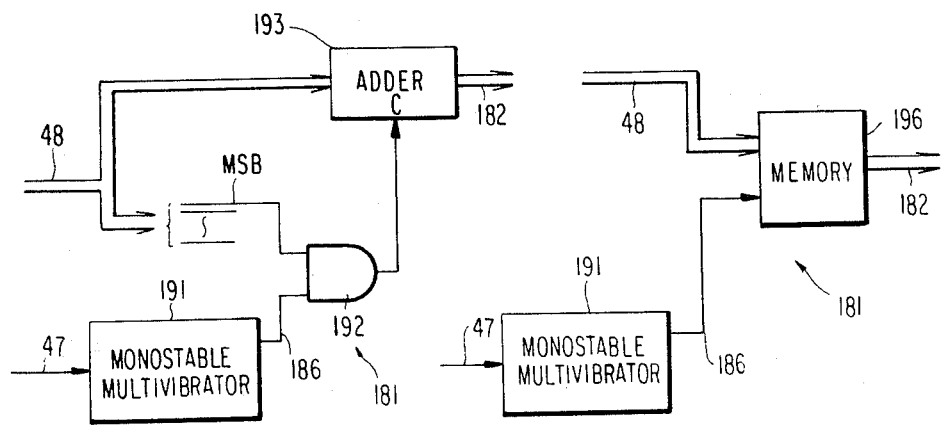
FIG. 21 is a block diagram of a position modifier circuit used in the system depicted in FIG. 18.
FIG. 22 is a block diagram of another position modifier circuit for use in the system illustrated in FIG. 18.

Referring now to FIG. 21, an example of the position modifier circuit 81 comprises a monostable multivibrator 191 triggered by the mode signal 47 indicative of the position control mode to produce a timing signal 186 of the logic "1" (high) level for a prescribed interval of time 187 (FIG. 20) after the mode signal 47 is switched to the logic "1" level from the logic "0" level. The timing signal 186 and the most significant bit (MSB) of the digital control signal 48 are supplied to a two-input AND gate 192 for delivering a logic "1" signal to a carry input terminal C of an adder 193 when the position error represented by the digital control signal 48 is not negative. The adder 193 receives also the digital control signal 48 and adds one (unity) to the position error represented thereby when supplied with a logic "1" signal at the carry input terminal C to produce the modified position signal 182.

Finally referring to FIG. 22, another example of the position modifier circuit 181 comprises a monostable multivibrator 191 of the type described in connection with FIG. 21. The timing signal 186 produced thereby and the digital control signal 48 are supplied to a memory 196 to specify an address thereof. Thus addressed, the memory 196 produces the modified position signal 182 representative of the reference angular velocity or the position error without any modification when the timing signal 186 has the logic "0" level and representative of the value of the position error plus one when the position error indicated by the digital control signal 48 is either zero or positive with the timing signal 186 given the logic "1" level.

Reviewing FIGS. 2, 4 through 6, and 10, it is possible to understand as the case may be that the control circuit 46, the integrator circuit 51, and the adder 123 cooperate as a control signal producing device responsive to the command signal 37-38 and the position pulses 62 or 63 for calculating the above-described displacement and for producing the aforementioned control signal 125 digitally representative of a reference angular velocity selected for the motor 26 in consideration of the displacement until an instant at which the displacement is reduced in absolute value to a predetermined value, a first positional error determined by the displacement during the prescribed interval defined in conjunction with FIGS. 18 through 22, and a second positional error having a value increasing in absolute value with relation to the displacement when the predetermined interval mentioned above lapses after the above-mentioned instant.

Again reviewing FIGS. 2, 4 through 6, and 10, the control circuit 46 can be regarded as a first signal producing device responsive to the command signal 37-38 and the position pulses 62 or 63 for calculating the displacement to produce a mode signal 47 and a first digital signal representative of the reference angular velocity until the above-mentioned instant, the first positional error during the prescribed interval, and a difference error corresponding to the displacement after lapse of the predetermined interval. Under the circumstances, both the first positional error and the difference error correspond to the position error described in conjunction with the figures being reviewed. The first digital signal corresponds to the digital control signal 48. The integrator circuit 51 can be deemed to be a second signal producing device responsive to the mode signal 47 and the first digital signal 48 for producing a second digital signal 52 representative of zero during the prescribed interval and for integrating the difference error after lapse of the predetermined interval to make the second digital signal 52 represent the integrated difference error as the second positional error.

Reviewing FIGS. 18 through 22 in addition to FIGS. 2, 4 through 6, and 10, it is possible to understand that the position modifier circuit 181 is included either in the control signal producing device or in the first signal producing device. In these cases, the modified position signal 182 corresponds to the control signal produced by the control signal producing device and the first digital signal, respectively. Alternatively, the control circuit 46 can be regarded as a first device comprised by the first signal producing device and responsive to the command signal 37-38 and the position pulses 62 or 63 for calculating the above-described displacement to produce the mode signal 47 and the digital control signal 48 representative of the reference angular velocity until the above-mentioned instant and a position error corresponding to the displacement after the instant. The position modifier circuit 181 can be deemed as a second device comprised also by the first signal producing device and responsive to the mode signal 47 and the digital control signal 48 for merely transmitting the digital control signal 48 as the first digital signal 182 representative of the reference angular velocity when the mode signal 47 indicates the velocity control mode, for modifying the position error to the first positional error during the prescribed interval to provide the first digital signal 182 representative of the first positional error, and for again merely transmitting the digital control signal 48 representative of the second positional error as the first digital signal representative of the difference error after lapse of the predetermined interval. More particularly, either an adder 193 or a memory 196 comprised by the second device 181 and responsive to the mode signal 47 and the digital control signal 48 is made to merely transmit the digital control signal 48 representative of the reference angular velocity and the difference error when the mode signal 47 indicates the velocity control mode and after lapse of the predetermined interval and made to modify the position error into the first positional error during the prescribed interval by adding one (unity) to the position error corresponding to one of the positive integers and zero and leaving the position error corresponding to one of the negative integers as it stands.

While a few preferred embodiments of this invention have thus far been described together with several modifications thereof, it is now readily possible for those skilled in the art to carry this invention into effect in various other ways. The embodiments described above in specific conjunction with forward feed carriage is applicable to carriage return. The movable element 25 may be the type wheel, a paper feed mechanism, or the motor axle per se. Other applications described in the above-mentioned copending patent application are possible. If desired, it is possible to further modify the position modifier circuit 181 so that one (unity) may be added to the zero and the positive values of the position error only during rotation of the motor 26 in the positive sense and that one may be subtracted from the zero and the negative values of the position error while the motor 26 is rotating in the negative sense.

What is claimed is:

1. A digital servo control system responsive to a command signal indicative of a commanded position of a movable element and a pair of incremental position signals having polarities variable with a phase difference therebetween in response to a predetermined incremental angle of rotation of a motor rotatable with a variable angular velocity to vary a present position of said element, for producing a motor drive signal for controllably driving said motor to position said element at said commanded position, said angular velocity having either of two senses at a time, said phase difference being representative of the sense of said angular velocity, said system comprising position pulse producing means responsive to said incremental position signals for producing position pulses representative of a variation in said current position, wherein the improvement comprises:

control signal producing means responsive to said command signal and said position pulses for calculating a displacement from said present position to said commanded position and for producing a control signal digitally representative of a reference angular velocity selected for said motor in consideration of said displacement until an instant at which said displacement is reduced in absolute value to a predetermined value, a first positional error determined by said displacement during a prescribed interval of time following said instant, and a second positional error having a value increasing in absolute value with relation to said displacement when a predetermined interval of time lapses after said instant, said prescribed interval being not longer in duration than said predetermined interval, said movable element being positioned substantially at said commanded position within said predetermined interval; and motor drive signal producing means responsive to said control signal and said position pulses for producing said motor drive signal.

2. A digital servo control system as claimed in claim 1, wherein said control signal producing means comprises:

first signal producing means responsive to said command signal and said position pulses for calculating said displacement to produce a mode signal indicative of a velocity control mode and a position control mode until said instant and at and after said instant, respectively, and to produce a first digital signal representative of said reference angular velocity until said instant, said first positional error during said prescribed interval, and a difference error corresponding to said displacement after lapse of said predetermined interval;

second signal producing means responsive to said mode signal and said first digital signal for producing a second digital signal representative of zero during the time that said mode signal indicates said velocity control mode during said prescribed interval and for integrating said difference error after lapse of said predetermined interval to make said second digital signal represent the integrated difference error as said second positional error after lapse of said predetermined interval; and means for calculating a sum of said first and said second digital signals to produce said control signal.

3. A digital servo control system as claimed in claim 2, said displacement having a magnitude equal to one of positive integers, zero, and negative integers at a time, wherein said first signal producing means produces said first digital signal by rendering from moment to moment said first positional error equal to the magnitude of the displacement by which said first positional error is determined at the moment.

4. A digital servo control system as claimed in claim 2, wherein said first signal producing means comprises:

first means responsive to said command signal and said position pulse for calculating said displacement to produce said mode signal and a digital control signal representative of said reference angular velocity until said instant and a position error corresponding to said displacement at and after said instant; and second means responsive to said mode signal and said digital control signal for merely transmitting said digital control signal as the first digital signal representative of said reference angular velocity when said mode signal indicates said velocity control mode, for modifying the position error to said first positional error during said prescribed interval to produce the first digital signal representative of said first positional error, and for again merely transmitting the digital control signal representative of said position error as the first digital signal representative of said difference error after lapse of said predetermined interval.

5. A digital servo control system as claimed in claim 4, said displacement having a magnitude equal to one of positive integers, zero, and negative integers at a time, wherein said second means comprises:

means responsive to said mode signal and said digital control signal for merely transmitting said digital control signal as the first digital signal representative of said reference angular velocity and said difference error when said mode signal indicates said velocity control mode and after lapse of said predetermined interval; and means responsive to said mode signal and said digital control signal for modifying the position error into said first positional error during said prescribed interval by adding one to the position error corresponding to one of the positive integers and zero and leaving untouched the position error corresponding to one of the negative integers.

6. A digital servo control system as claimed in claims 1, 2, 3, 4, or 5, wherein said motor drive signal producing means comprises:

pulse width modulating means responsive to an input signal having a level variable with time for producing a pulse width modulated signal having a pulse width variable in proportion to said level;

means responsive to said pulse width modulated signal for producing said motor drive signal; and input signal producing means responsive to said control signal and said position pulses for producing said input signal.

7. A digital servo control system as claimed in claim 6, wherein said input signal producing means comprises:

means responsive to said position pulses for producing a velocity signal representative of said variable angular velocity; and means responsive to said control signal and said velocity signal for producing said input signal.

* * * * *